Aug. 22, 1967    R. E. AUSTIN    3,336,805
ATHLETE CLASSIFIER
Filed Aug. 12, 1964
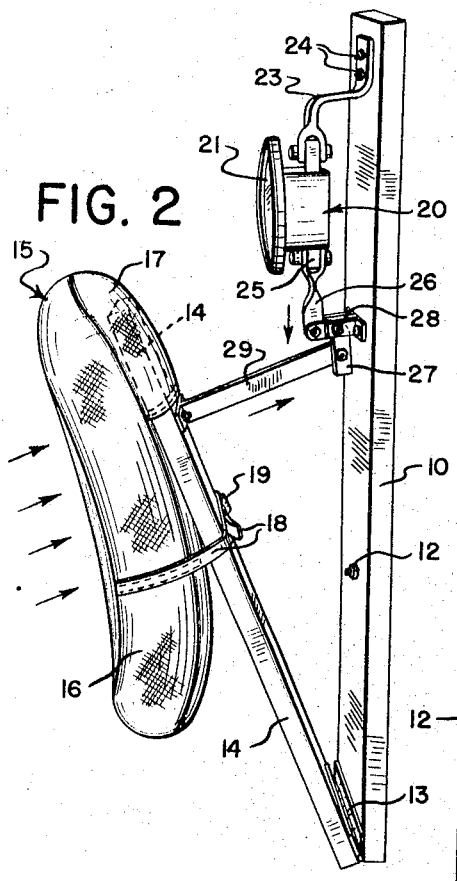
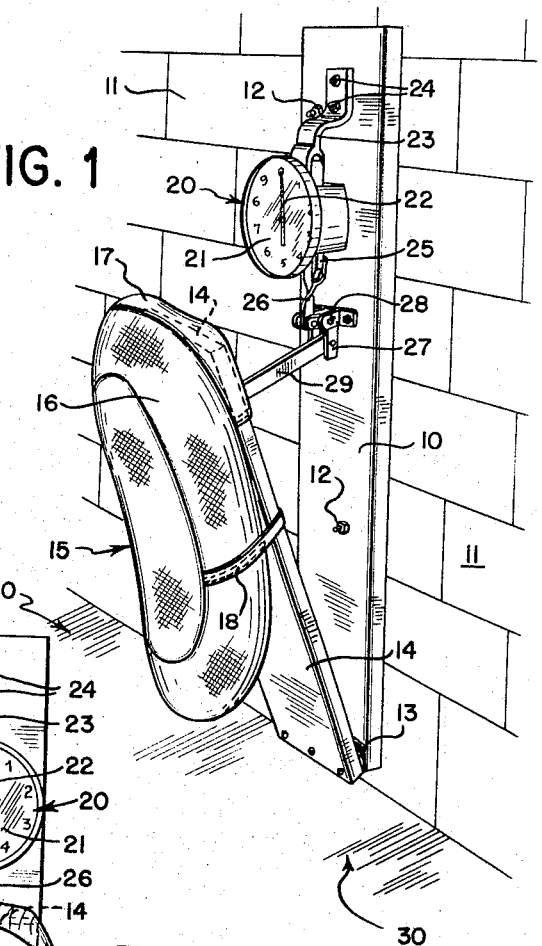
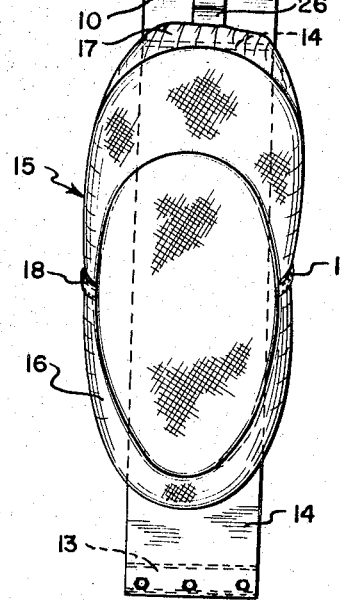
INVENTOR
Raymond E. Austin
BY
ATTORNEYS United States Patent Office 3,336,805
Patented Aug. 22, 1967

3,336,805
ATHLETE CLASSIFIER
Raymond E. Austin, Freeport, N.Y., assignor to
R. E. Austin & Son, a copartnership
Filed Aug. 12, 1964, Ser. No. 389,038
1 Claim. (Cl. 73—381)

This invention relates to force measuring devices and more particularly to a device or apparatus for measuring the impact ability of an athlete.

In schools for boys and young men when they present themselves as candidates for althetic teams, and particularly for the football squad, it is difficult for the instructor or coach to size up each individual in regard to the particular athletic activity such as a position on the football team for which the individual is best adapted. This presents something of a problem for the instructor or coach particularly in view of the large increase in population and consequent increase in school attendance and in the number of applicants for athletic exercises.

The coach can be aided in his work if he has some way of classifying the applicants as to their physical strength, and, especially for a football squad, the applicant's ability so far as bodily thrust or impact is concerned. The present invention aims to provide a device for measuring the amount of force which an individual can exert by means of bodily thrust or impact against a "dummy" or its equivalent.

In accordance with the invention a body cushioning pad, somewhat in the nature of a football "dummy" is mounted on appropriate mechanism which is interconnected with a force measuring instrument so that the force produced by a thrust of the body, for example the shoulder, against the cushioning pad can be accurately measured. More specifically, a mounting member is secured in upright position to a firmly fixed support such as the wall of a gymansium, or a heavy post, or other convenient support, on the athletic field. Hinged to the lower portion of this mounting member there is a lever, conveniently in the form of a rigid panel or plank of suitable width and thickness, and the body cushioning pad is secured in any suitable way to the face of this lever.

The pad is of suitable dimensions both vertically and horizontally to prevent the body of the one being classified from contacting the plank. Also mounted, desirably on the mounting member, there is an appropriate force measuring instrument which for example may include a tensioning spring to which a pointer is operatively connected in such manner as to indicate the tension applied to the spring. Such force measuring instrument is interconnected in any suitable way to the lever on which the pad is mounted.

The invention will be better understood from consideration of the more detailed description following a short reference to the three figures of the accompanying drawings. In these drawings:

FIG. 1 is a perspective view showing the device of the invention mounted upon a vertical wall;

FIG. 2 is a side view, also in perspective of the device shown in FIG. 1 looking from the right;

FIG. 3 is a front elevation of the device.

Referring to these drawings a mounting member or panel is indicated at 10 and is secured to the wall 11 in any suitable manner as for example by means of the bolts 12. Hinged to the lower portion of panel 10 by means of a rugged hinge 13 such as the continuous piano hinge indicated is a lever 14 in the form of a panel member. Members 10 and 14 may conveniently be made of heavy boards or planks of appropriate thickness and width.

Appropriately secured to the front face of the lever board or panel 14 is the body cushioning pad 15. This pad has a central member (not visible) of rubber or the like which is inflated with air under suitable pressure, this member having a canvas cover 16 as shown. The upper end of this cover 16 is provided with a pocket or boot portion 17 which is adapted to slide over the upper end portion of lever board 14 to aid in securing the pad 15 to the board. The lower portion of the pad is secured by means of a pair of straps 18 which are buckled together as indicated at 19.

A force measuring instrument is indicated at 20 and includes a dial 21 over which a pointer 22 moves. This instrument is capable of measuring and indicating forces up to a maximum of 1,000 pounds. The frame of the instrument is supported at the top by means of a bracket 23 which is bolted as shown at 24 near the upper end of mounting panel 10. The operating member of the instrument is indicated at 25 and moves downwardly from the bottom of the instrument casing as a larger and larger force is applied.

Member 25 is connected by means of a link 26 to the horizontal arm of a right angle lever 27 which is pivoted at 28 to a bracket which is secured to the face of mounting panel 10. The vertical arm of lever 27 is connected by means of a link 29 to lever board 14.

It will thus be understood that as force is applied to the pad 15 towards the right as shown in FIGS. 1 and 2, the linkage just described will serve to tension the spring (not shown) within the force measuring instrument and turn the indicating pointer 22 in a clockwise direction. It is to be noted that the two arms of lever 27 are substantially equal in length so that only a small movement of lever panel 14 and link 29 is required in order to actuate pointer 22 of the force measuring instrument to maximum indication.

The vertical height of the body cushioning pad 15 is such as to correspond approximately to the length of the average torso of a boy or young man, and while it is intended that the thrust or impact against the pad shall be made by the shoulder, the thrust can actually be made by any part of the body from the shoulder to the hips.

In using the apparatus a foot mark is placed on the floor, such as floor 30 in front of wall 11 and at any distance desired by the coach or instructor. It is intended that this distance shall be in the neighborhood of two steps or about 6 feet from the pad 15 when in the position shown in the drawings. Each person to be classified, or whose impact ability is to be measured, starts from this foot mark and hits the pad 15 in a crouched position with either the right or left shoulder. Pad 15 is made to have a concave front surface as this form and the leaning of lever panel 14 and pad 15 in the direction of the approach of the athlete help to prevent the shoulder from sliding off the pad, either sidewise or from the top, which would be apt to happen if the pad were straight vertically. The instructor or coach watches pointer 22 at the instant of impact to obtain the maximum reading. It will be understood that if desired any conventional form of maximum position indicator for pointer 22 may be incorporated in the force measuring instrument 21. It will also be understood that in place of an indicating type of instrument 21, a registering type may be used and thus provide a written record of the result of the test.

I claim:

In a device for measuring the impact ability of an athlete, said device being fixed to an immovable support extending upwardly from a surface on which the athlete stands, including a mounting panel secured in an upright position to said support, a lever panel hinged to the mounting panel adjacent said surface to pivot in a vertical plane, a force-measuring instrument including a dial indicator secured to the mounting panel, said force-measuring instrument being capable of indicating high impact forces with very little movement of its actuating elements, a body cushioning pad secured to the face of the lever panel to cushion the force of the bodily impact of the athlete against said panel, and interconnecting means between the lever panel and the force-measuring instrument to transfer to such instrument the force of impact against the pad, said interconnecting means comprising an elongated link extending substantially perpendicular away from the lever panel towards the mounting panel and being attached at its remote end from the lever panel to a lever which is pivoted intermediate its ends within a bracket, the other end of said lever being connected to the actuating elements of the force-measuring instrument, said cushioning pad arranged in a leaning position towards the approach direction of the athlete so that as the athlete hits the cushioning pad in a crouched position the pad and lever panel rise slightly in resisting the impact and also the force of the impact is measured without prolonged movement of the lever pad.

References Cited

UNITED STATES PATENTS

| | | | |
|---|---|---|---|
| 344,095 | 6/1886 | Fowler | 73—381 |
| 414,330 | 11/1889 | Schultze | 73—381 |
| 452,602 | 5/1891 | Emerson | 73—141 |
| 546,392 | 9/1895 | Troxler | 73—381 |
| 1,288,953 | 12/1918 | Mazewicz | 73—141 |
| 2,558,081 | 6/1951 | Gardenhour | 273—55 |
| 3,236,101 | 2/1966 | Lemonick | 73—379 |

RICHARD C. QUEISSER, *Primary Examiner.*

J. H. WILLIAMSON, *Assistant Examiner.*